United States Patent
Bowker et al.

(10) Patent No.: US 6,317,790 B1
(45) Date of Patent: Nov. 13, 2001

(54) METHOD AND SYSTEM FOR INTERRUPTING PAGE DELIVERY OPERATIONS IN A WEB ENVIRONMENT

(75) Inventors: Michael Bowker, Cupertino; Vivek Sharma, San Francisco, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/187,293

(22) Filed: Nov. 5, 1998

(51) Int. Cl.[7] ............................................. G06F 15/173
(52) U.S. Cl. ................................... 709/225; 709/227
(58) Field of Search .................................. 709/227, 228, 709/203, 219, 225

(56) References Cited

U.S. PATENT DOCUMENTS

| | | | | |
|---|---|---|---|---|
| 5,724,521 | * | 3/1998 | Dedrick | 395/226 |
| 5,740,549 | * | 4/1998 | Reilly et al. | 705/14 |
| 5,754,939 | * | 5/1998 | Herz et al. | 455/4.2 |
| 5,761,662 | * | 6/1998 | Dasan | 707/10 |
| 5,832,212 | * | 11/1998 | Cragun et al. | 395/188.01 |
| 5,848,396 | * | 12/1998 | Gerace | 705/10 |
| 6,009,410 | * | 12/1999 | LeMole et al. | 705/14 |
| 6,044,376 | * | 3/2000 | Kurtzman, II | 707/102 |

* cited by examiner

Primary Examiner—John A. Follansbee
(74) Attorney, Agent, or Firm—Hickman Palermo Truong & Becker LLP; Brian D. Hickman

(57) ABSTRACT

A system, method, and computer readable-medium for interrupting client requests in a web environment are provided. The system includes a server, such as a web server, for receiving a request from a particular client. Rather than directly supplying the requested information, the server determines whether unrequested operations should be performed. If unrequested operations should be performed, then the server performs one or more unrequested operations before returning the originally requested information to the particular client.

49 Claims, 4 Drawing Sheets

METHOD AND SYSTEM FOR INTERRUPTING PAGE DELIVERY OPERATIONS IN A WEB ENVIRONMENT

FIELD OF THE INVENTION

The present invention relates to networked computer systems, and more specifically to interrupting page delivery operations in a web environment.

BACKGROUND OF THE INVENTION

The World Wide Web includes a network of servers on the Internet, each of which is associated with one or more HTML (Hypertext Markup Language) pages. The HTML pages associated with a server provide information and hypertext links to other documents on that and (usually) other servers. Servers communicate with clients by using the Hypertext Transfer Protocol (HTTP). The servers listen for requests from clients for their HTML, pages, and are therefore often referred to as "listeners."

Users of the World Wide Web use a client program, referred to as a browser, to request, decode and display information from listeners. When the user of a browser selects a link on an HTML page, the browser that is displaying the page sends a request over the Internet to the listener associated with the Universal Resource Locator (URL) specified in the link. In response to the request, the listener transmits the requested information to the browser that issued the request. The browser receives the information, presents the received information to the user, and awaits the next user request.

In some computing environments, a computer user is a "captive audience". For example, the information that is presented to the user of stand-alone software program for the user to get from one program state to another program state is dictated by the program logic of the software in question, and cannot be easily circumvented by the user. Thus, the developer of the stand-alone software can force the user to perform certain actions or view certain information before proceeding to a particular program state.

In contrast, a user of the World Wide Web has virtually unlimited control over the selection of information presented to him or her, and the sequence in which the information is presented. For example, the developer of a particular web site may design a series of web pages that are intended to be viewed in sequence. However, nothing prevents a user from breaking that sequence to view web pages provided at a different site by an entirely different web site developer.

The freedom afforded users of the World Wide Web has encouraged site developers to adopt other ways to encourage users to perform actions or view information that the users would otherwise not choose to do. For example, web site developers frequently encourage web users to view advertisements (which most users would not voluntarily request) by placing attractive links to the advertisements, often in the form of "banners", on web pages that contain information that a user would voluntarily request. The banners may use additional forms of enticement, such as a chance to win a vacation, to encourage the web users to voluntarily request the information they contain.

Even when web site developers invest a significant amount of resources to coax their users to voluntarily perform certain actions, such as view advertisements, they cannot always be sure that all users will voluntarily perform those actions. In some cases, having users perform those actions may be critical to the goal of the site provider. Consequently, it is desirable to provide to web site providers a mechanism for encouraging web users to perform actions or view information that they might not otherwise voluntarily perform when accessing web pages from a web server that has been modified according to the present invention.

SUMMARY OF THE INVENTION

A method, system, and computer-readable medium for server interruption of client requests are provided. According to one aspect of the invention, a server receives a request from a client for a particular set of information. In the context of the World Wide Web, the client, server and requested information will typically be a browser, web server and web page, respectively.

In response to the request, the server collects supplemental information about the client from a server-side storage unit. The supplemental information may, for example, take the form of a user profile that contains information about the interests of the specific user that issued the request. The server determines, based on the supplemental information, whether to "interrupt" the request by performing one or more unrequested operations prior to supplying the particular set of information to the client.

If the server determines that one or more unrequested operations should be performed, then the server causes the one or more operations to be performed prior to supplying the particular set of information to the client. After performing the one or more operations, the server replies to the client with the particular set of information. If the server determines not to perform the one or more operations, then the server replies to the client with the particular set of information.

In one embodiment, the decision of whether to interrupt a request is made during the authentication process when a user has requested restricted information. In this embodiment, the act of supplying requested data to the user is selectively interrupted after the user has identified him or herself, and before the requested information is supplied to the user.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system for interrupting page delivery in a web environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 3:
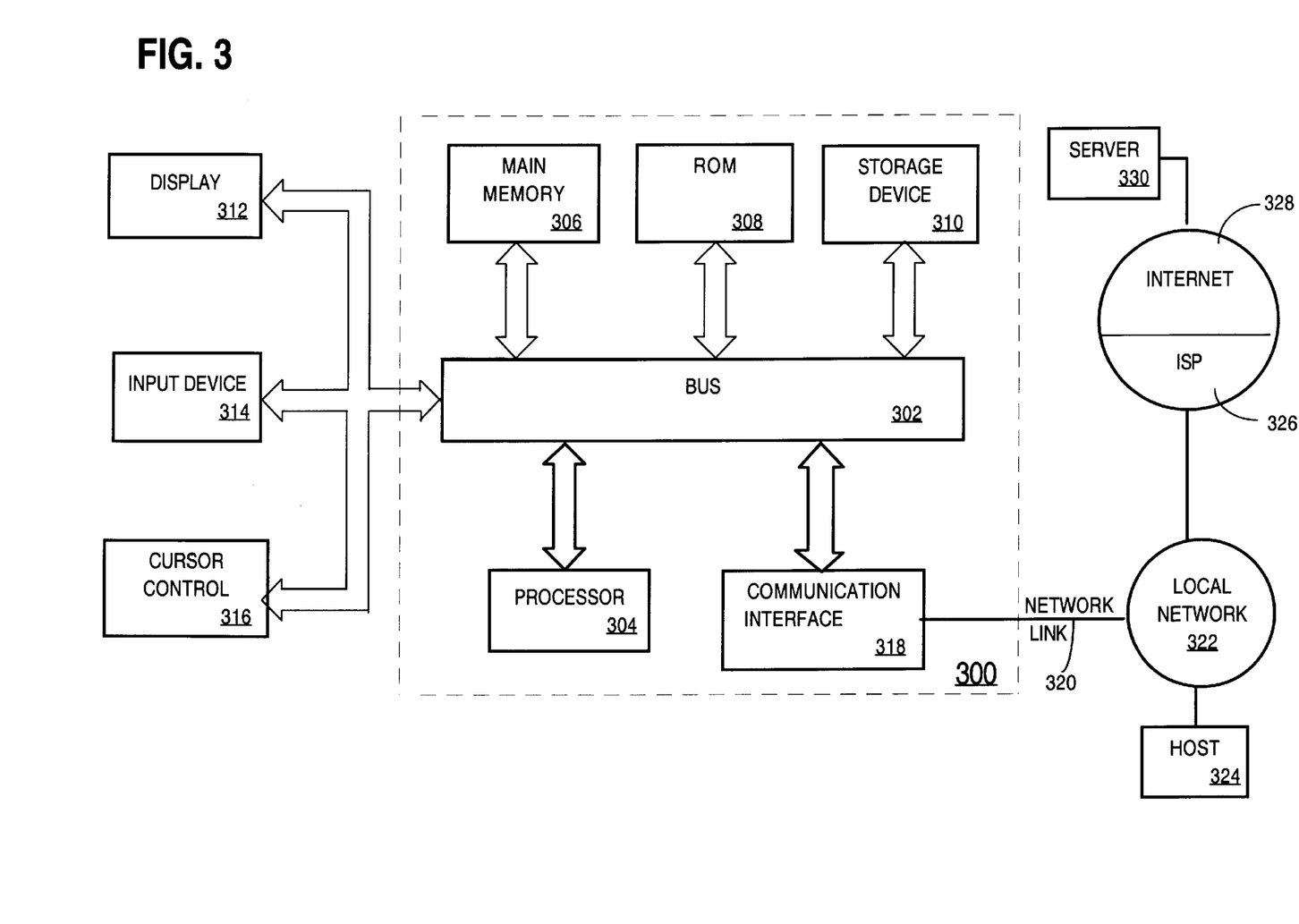
FIG. 3 is a block diagram of a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for interrupting page delivery in a web environment. According to one embodiment of the invention, interruption of page delivery in a web environment is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for interrupting page delivery in a web environment as described herein.

The received code may be executed by processor 304 as it is received, and/or stored in storage device 310, or other non-volatile storage for later execution. In this manner, computer system 300 may obtain application code in the form of a carrier wave.

REQUEST INTERRUPT OVERVIEW

According to one aspect of the invention, a request interrupt mechanism is provided which allows web site providers to interrupt user requests for information from their web site. Rather than initially responding to user requests with the requested information, the request interrupt mechanism determines whether certain unrequested operations should be performed for the specific user that issued the request. If the request interrupt mechanism determines that the unrequested operations should be performed for that particular user, then the interrupt request mechanism executes those unrequested operations before the user's originally requested web page is returned to the user. Those unrequested operations may be, for example, operations that the user may not have otherwise voluntarily requested. For example, the operations may include displaying advertisements to the user, or sending a request to the user for certain information.

To determine whether any unrequested operations are to be performed for a particular user, the request interrupt mechanism retrieves supplemental information about the particular user from a server-side database. If, based on the supplemental information, it is determined that no unrequested operations are to be performed, the requested information is delivered to the user without any further action required by the user. However, if the request interrupt mechanism determines unrequested operations are to be performed, those operations are executed. After the unrequested operations have completed, the originally requested web pages are delivered to the user, either automatically or in response to the user selecting a link on a page generated as part of the unrequested operations.

For example, supplemental information inspected by the request interrupt mechanism in response to a request may be information about the user that is issuing the request. This supplemental information, which may be stored in a server-side database, may be missing an email address of the particular user requesting information. Based on this supplemental information, the request interrupt mechanism may determine that it should interrupt the delivery of the requested information and prompt the user to supply their email address. After the user supplies the email address, the originally requested information is delivered to the user.

INTERRUPT THE DELIVERY OF RESTRICTED INFORMATION

According to one embodiment, the request interrupt mechanism is configured to selectively interrupt delivery of restricted access web pages. Restricted access web pages are web pages that are only provided to users that are authorized to access the web pages. Typically, users must identify themselves to a web site before the web site will supply the users with the restricted access web pages. Information that users send to a web site to identify themselves is referred to herein as authentication information.

Authentication information may take many forms. One common form of authentication is a userid combined with a password. Authorization information may additionally or alternatively consist of a particular IP address, specific domain name or other information that can identify a particular user and/or machine attempting to access information.

Prior to describing a system in which access to a restricted access web page is selectively interrupted, a brief description will be given of a conventional technique for accessing restricted web pages with reference to FIG. 1.

Figure 1:
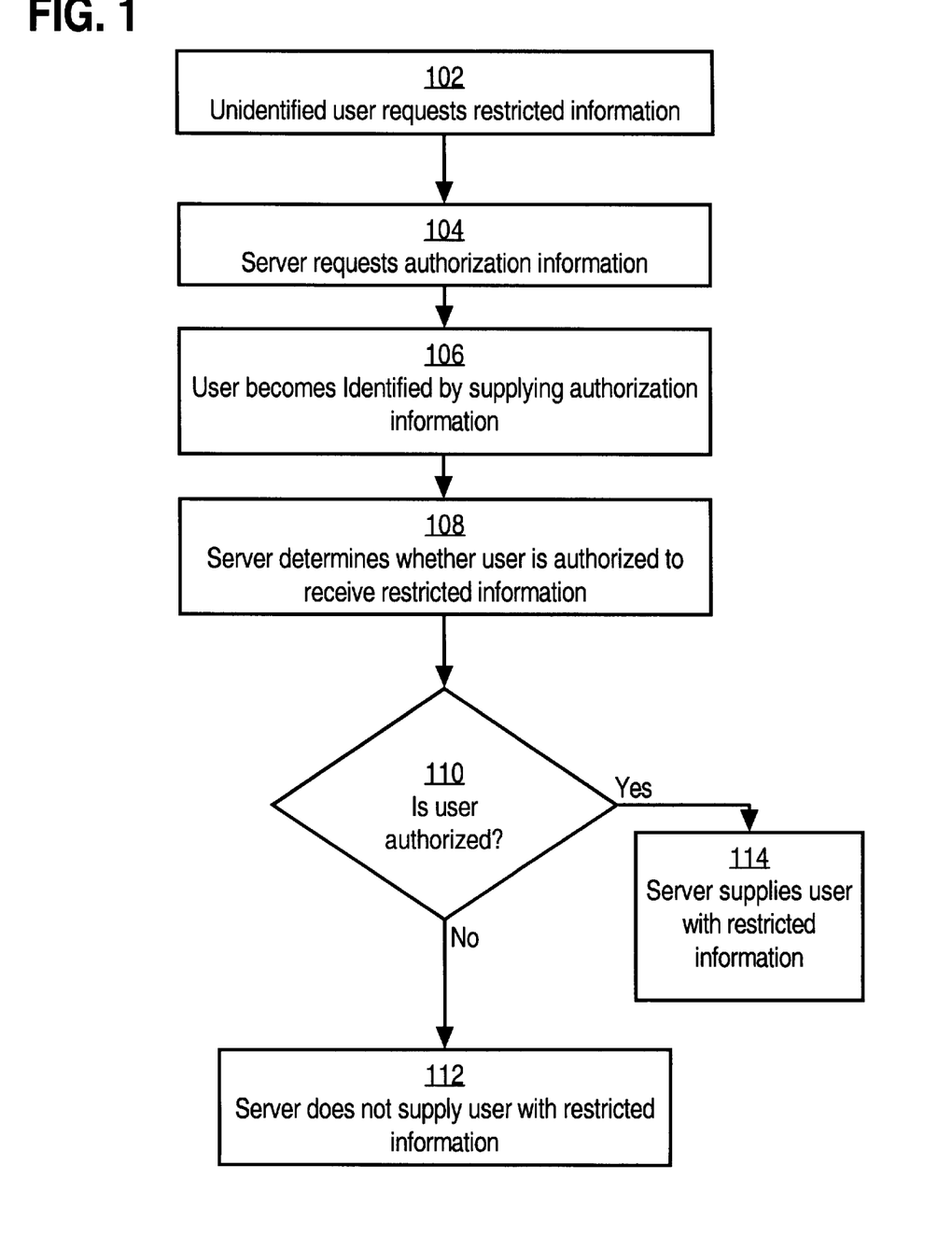
FIG. 1 is a flow chart illustrating steps for providing restricted information to a client.

Referring to FIG. 1, it is a flow chart illustrating steps for accessing restricted web pages. At step 102, a user requests restricted web pages from a web site. For example, the restricted web site may a sporting news site, where the provider of the sporting news restricts the delivery of sporting web pages to their subscribed customers.

At this stage, the web site may not be able to identify the particular user attempting to access the restricted web pages. At step 104, the web server requests the user to provide authentication information by which the web server (1) identifies the user, and (2) determines whether the user is allowed to access the restricted web sight. Typical authentication information consists of a userid and password.

The user supplies the authentication information the web server at step 106. At step 108, the web site determines whether the user is authorized to receive the restricted web pages. According to one embodiment, this determination is made by comparing the user-supplied authentication information with server-side authentication information. When the user-supplied authentication information is a userid and password combination, then the server-side authentication information may be a list of userid/password combinations for users that are authorized to access the sporting news web pages.

If at step 110 it is determined that the user is authorized to receive the restricted web pages, then the web server supplies the user with the originally requested restricted web pages at step 114. If at step 110 it is determined that the user is not authorized to receive the restrict web pages, then the web server does not supply the requested restricted web pages at step 112. For example, upon receiving the authentication information from the user, the sporting news web server determines whether the authentication information is authentic. If so, the requested sporting news web pages are delivered to the user. If not, the sporting news web server does not delivery the sporting news web pages.

Figure 2:
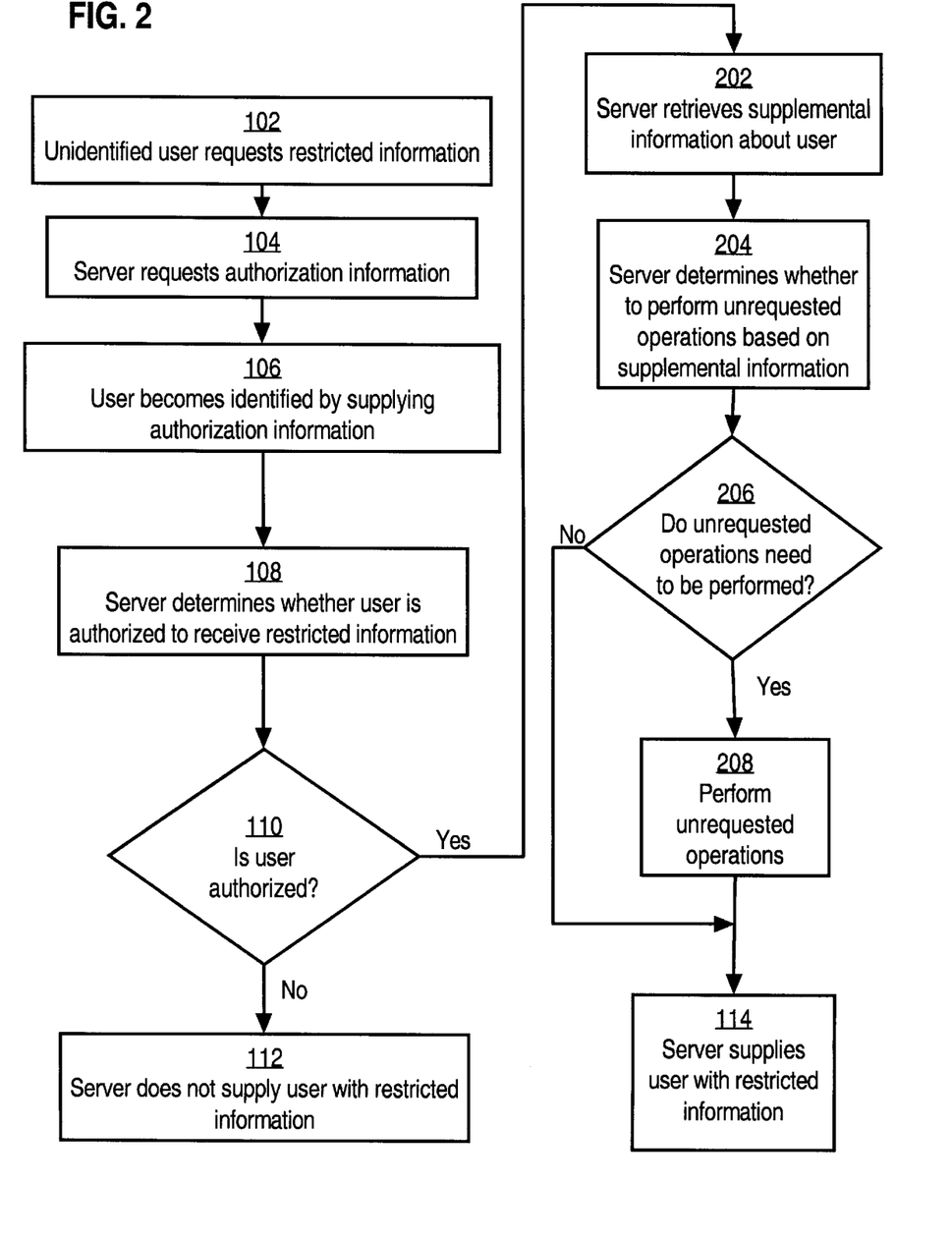
FIG. 2 is a flow chart illustrating the sequence of steps for interrupting page delivery operations when a restricted web page is requested, according to an embodiment of the invention.

Having described a conventional authentication process used to access restricted access web pages, a system in which access to a restricted access web page is selectively interrupted shall now be described with reference to FIG. 2. Referring now to FIG. 2, it illustrates a technique for interrupting a request for a restricted access web page, according to an embodiment of the invention. FIG. 2 includes many of the same steps as FIG. 1, with additional steps that indicate the logic for selectively interrupting the normal authentication process.

In FIG. 2, steps 102, 104, 106, 108, 110, 112 and 114 are performed in the same manner as the similarly number steps in FIG. 1. However, if the user is authorized to access the restricted information, control does not automatically pass from step 110 to step 114 where the restricted information is supplied. Instead, control passes to step 202.

At step 202, the web server retrieves supplemental information about the user. The web sever determines whether to perform unrequested operations based on the supplemental information at step 204. If, based on the supplemental information, it is determined that unrequested operations need to be performed, unrequested operations are performed at step 208. Upon the completion of performed the unrequested operations at step 208 the web site supplies the user with the originally requested restricted web pages at step 114. On the other hand, if it is determined that unrequested operation do not need to be performed, then control passes directly from step 206 to 114 and the restricted web page is supplied to the user.

Applied in the context of a web server that supplies restricted sports information, the request interrupt mechanism may be employed as follows. After a user is authenticated to receive a restricted web page from a sporting news web site, the request interrupt mechanism may read information about the user that is stored in a server-side database. The information may indicate that the user's favorite player is being traded to another team. The request interrupt mechanism interrupts delivery of the originally requested web page to provide the user with the web page containing information about the trade. After the user has viewed the information, the web site supplies the user with the originally requested restricted web page.

EXEMPLARY SYSTEM

Figure 4:
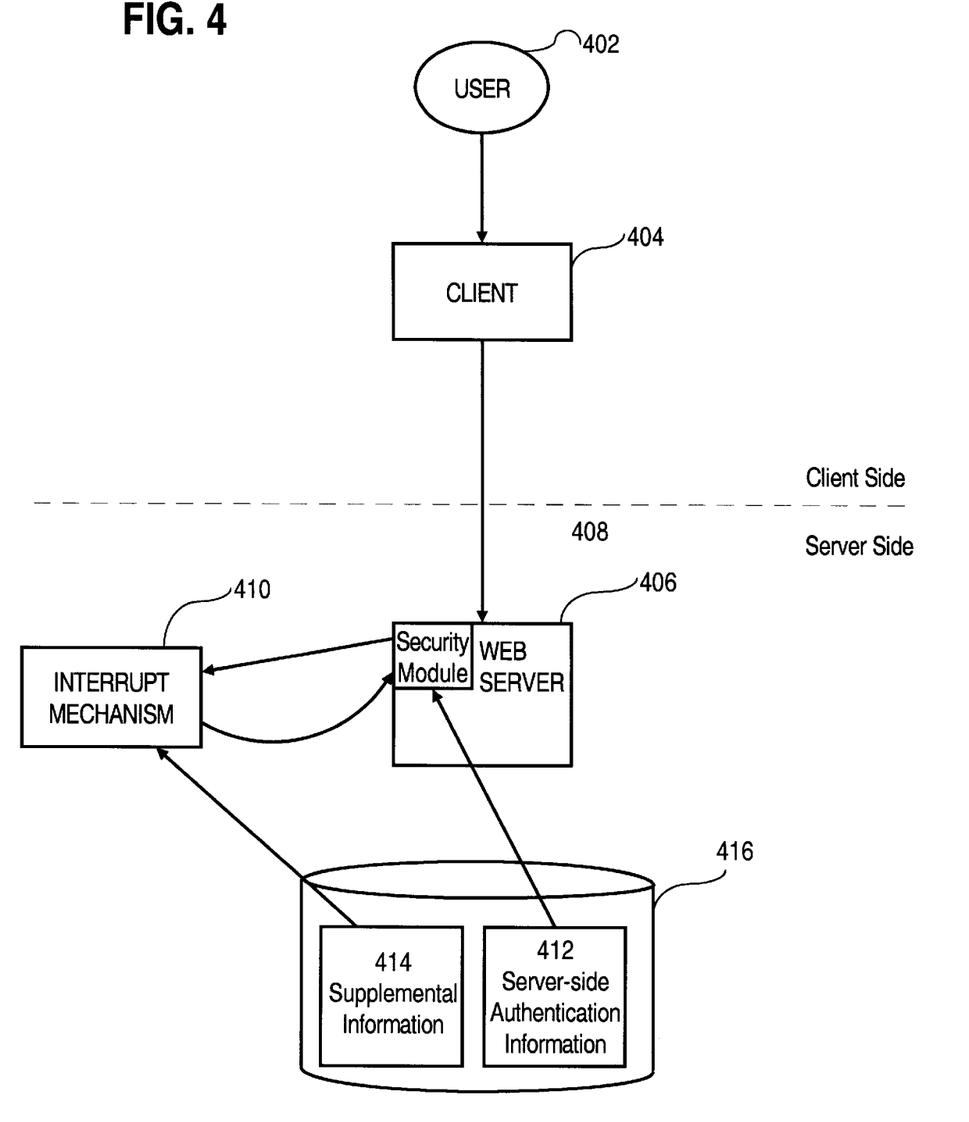
FIG. 4 is a block diagram of a system that includes a request interrupt mechanism according to an embodiment of the invention.

FIG. 4 is a block diagram of a system configured to implement a request interrupt mechanism according to one embodiment. The system generally includes a client 404 and a server 406. The client 404 allows a user 402 to request information from the server 406. When the request is for restricted data, a security module 408 in the web server 406 compares authentication information supplied by the user 402 to server-side authentication information 412 to determine whether the user 402 is authorized to access restricted information. If user 402 is authorized to access the requested restricted information, the security module 408 invokes an interrupt mechanism 410. The interrupt mechanism 410 retrieves supplemental information 414 from a server-side storage unit 416 and determines, based on the supplemental information 414, whether unrequested operations are to be taken before the user 402 is supplied with the requested information. If unrequested operations are to be taken, then interrupt mechanism 410 causes the unrequested operations to be performed before web server 406 supplies the user 402 with the requested information.

REQUEST INTERRUPT MECHANISM LOGIC

As explained above, the request interrupt mechanism determines whether unrequested operations are to be performed prior to supplying requested data to a user. The interrupt mechanism makes this determination based on the supplemental information associated with the requester and the decision logic employed by the request interrupt mechanism.

The decision logic employed by the request interrupt mechanism may be hard coded or programmed. In a programmed embodiment, the request interrupt handler may, for example, read metadata that specifies (1) conditions, related to the supplemental data, that trigger an interrupt and, (2) interrupt operations for each of the conditions. For example, the metadata may specify that if a user profile is missing an e-mail address, then an interrupt requesting the e-mail address should be performed. It may further specify that if the user profile of the requester indicates that the requester is from Vermont, then an interrupt that sends certain advertisements to the user is to be performed before sending the requested data. It may further specify that if the user profile of the requester indicates that the requester is interested in sports, then the request should be interrupted by executing a particular executable program before transmitting the requested information to the requester.

SERVER-SIDE DATA RETRIEVAL

To determine whether to perform unrequested operations for a particular client, the request interrupt mechanism retrieves supplemental information from server-side storage. The supplemental information may be stored on the server-side storage using any one of a variety of storage formats and mechanisms. For example, the supplemental information may be stored in relational tables managed by a relational database, or merely within a flat file. A relational database managed by a database management system will provide the traditional benefits of a database management system such as transaction control, efficient I/O, and automatic backup and recovery.

For the purpose of explanation, the step of retrieving server-side authentication information 412 and the step of retrieving the supplemental information 414 have been described as separate operations. However, they may alternatively be combined in a single operation that performs both functions. For example, in one embodiment of the invention, both the server-side authentication information and the supplemental information are stored in a relational database. The information may be stored together as records about specific users, where the record for a given individual include fields for the authentication information for the individual (e.g. userid and password) and for the supplemental information (e.g. e-mail address, age, interests, etc.)

To both authenticate a user and retrieve supplemental information about the user, the security module is configured to issue an SQL query against the database. The SQL query may, for example, request the record for the individual whose userid and password match the userid and password supplied by the user. If the userid and password do not match any user record, or match the record of a user who does not have permission to access the requested web information, then the authentication fails. However, if the userid and password match a user record, the supplemental information is supplied to the interrupt mechanism and does not have to be independently requested.

TARGET MARKETING OPERATIONS

According to one embodiment, the request interrupt mechanism is used to market products and services of a particular interest to specific users. In this embodiment, the supplemental information contains data indicating the activities or interests of individual users. The request interrupt mechanism interrupts the user's request for information and determines which activities or interests are of interest to the particular user, and delivers marketing materials directed to those interests to the user. After the user receives the marketing information, the interrupted page is delivered.

MULTIPLE INTERRUPTS

The request interrupt mechanism interrupts a user's request for a restricted web page to perform one or more operations before the originally requested web page is delivered. In one embodiment, even after unrequested operations performed, the originally requested information is not immediately delivered. Rather, the request interrupt mechanism determines once again if unrequested operations are required based on the supplemental information. That is, control passes from step 208 back to step 202, rather than proceeding to step 114. However, when step 202 is executed for a subsequent iteration, the supplemental information may have been modified during the performance of a previous unrequested operation. Consequently, unrequested operations may be performed due to modifications performed or data supplied during previously executed unrequested operations.

For example, during a first iteration of steps 202–206, the web interrupt mechanism may determine that a user's list of favorite activities and interests require updating. The unrequested operation performed during this iteration is to present the user with a form for entering favorite activities. After the user updates this list of favorite activities and interests, the interrupt mechanism may re-execute steps 202–206. However, during this iteration, the user's supplemental information includes new information about the user's interests. Therefore, at step 206 the web server may determine to perform other unrequested operations in response to this new information. During this iteration, the unrequested operations may include, for example, delivery web pages containing information about the users newly-specified interests. This second set of unrequested operations is also performed before delivering the user's originally requested restricted web pages. This embodiment would also be useful to check the accuracy and completeness of data updated to a database in a previous operation.

In an embodiment that loops back to step 202 after performing an unrequested operation, it is possible for the user to get stuck in an infinite loop. An "infinite loop" is an anomaly where conditions are such that users never receives their originally requested web page. Various techniques may be used to prevent this from happening. According to one embodiment, the request interrupt mechanism tracks how many interrupts it has performed for a given request and delivers the user's originally requested restricted web pages after a threshold number of interrupts have occurred. If the maximum acceptable number of interrupts is two, for example, the web server may simply store a flag to indicate that an interrupt has been performed. After performing an interrupt, the flag is checked. If the flag is set, then it is cleared and control passes from step 208 to step 114. If the flag is not set, then the flag is set and control passes to from step 208 back to step 202.

When the maximum acceptable interrupts are greater than two, the request interrupt mechanism may consist of an interrupt counter and data that indicates a predefined maximum limit of interrupts to be performed. Each time an interrupt is performed, the request interrupt mechanism increments the interrupt counter by one. The request interrupt mechanism then determines whether the maximum limit of interrupts has been reached. If so, the user's originally requested web pages are delivered.

For example, upon interrupting a users request for sporting news, the conditions may be such that the request interrupt mechanism will perform one operation for each of the fifteen teams in the National Baseball League. However, the request interrupt mechanism may be set to limit the number of operations to three. Hence, after information about the third team is displayed to the user, the user's originally requested web page will be delivered.

REQUESTED PAGE DELIVERY

As described above, the user is supplied the requested web page after any appropriate interrupt operations have been performed. However, due to the nature of the web environment, under certain conditions subsequent user input may be required to initiate the delivery of the interrupted web page.

For example, assume that the unrequested operation that is performed during an interrupt is to send to the user an unrequested web page that contains advertisements directed to the interests of the user. Under those conditions, it may be desirable to have the user view the advertisement as long as desired, and simply include on the advertisement web page a user interface object which, when selected, will cause the originally requested web page to be supplied to the user. Optionally, the link to the originally requested information may include data to indicate to the web server that the requested web page should be supplied directly, without determining whether a subsequent interrupt should be performed before supplying the requested information.

Other types of events that may trigger the supply of the requested web page include, for example, the elapse of a predetermined period of time after delivery of the marketing material. Thus, the user may view marketing material targeted specifically to the interests of the user for five seconds before the requested web page is delivered. According to one embodiment, different interrupt rules may be associated with different requested page supply rules. For example, the request interrupt mechanism may be configured to implement the following two rules: (1) if the profile of the requester indicates that the requester is interested in sports, then interrupt the request by sending a web page containing sporting goods advertisements, wait five seconds, then send the requested web page; (2) if the profile of the requester is missing e-mail information, then interrupt the request by sending a form for supplying the e-mail information, where the form includes a link that allows the user to retrieve the originally requested web page.

EXEMPLARY SOURCE CODE

Appendix A includes source code for routines that may be used to implement an embodiment of the invention. The included code portions allow an event trigger to be generated and handled. The code included in this Appendix A works with Apache Version 1.2.5 on Solaris 2.4. There is also some Java code which is based on JDK 1.1, Solaris 2.4, downloaded from www.javasoft.com. The shell scripts are intended for the Bourne Shell.

The implementation illustrated by the code focuses on having just one event trigger. However, the concept can be generically applied to multiple triggers by appropriate changes in code. The embodiment implemented by the code contained in Appendix A manifests externally as follows:

A user attempts to access a page in a secure section of the web site. Authentication is done against the database. If the person is a valid user, the profile of the requester (non authentication related information in the database) is checked to make sure required information is not missing. If required information is missing, the interrupt is triggered and the interrupt handler brings up the page related to the interrupt, where the user fills out the required information.

The information is written to the database, the user is presented with a thank you page. When the user clicks on a button on the thank you page, he/she is routed back to the originally requested page.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX A—SOURCE CODE

Editorial note:

A series of dots (eg. . . . ) in the code indicate that there is some code here which hasn't been reproduced simply because it doesn't hold relevance in the current context, even though it may be necessary for the overall picture. This is done so that the document focuses only on relevant pieces.

httpd.h

In this file a variable is being declared which will store values returned by the authentication module—this value will be used by the rewrite module to determine whether a redirection to the trigger page is required or not. For convenience, it also defines values that this variable can take on. In the declaration of "struct conn_rec", add an "int authResult;"—the code portion looks like:

```
struct conn_rec {
pool *pool;
server_rec*server;
    server_rec base_server; /Physical vhost this conn come in on */
    void vhost_lookup_data; /used by http_vhost.c */
/* Information about the connection itself */
int authResult;
    .......
Also, define possible values for this:
/* Possible values of authResult */
#define VAL_INVALID 0
#define INVALID_USER 1
#define FIELDS_OK 2
``` http_main.c

In this file the value "authResult", declared above, is initialized to VAL_INVALID so that by default it's assumed that the trigger should be fired off. This value should be set for each new connection that is established by the web server. For this we set the value in the function "new_connection" in http_main.c.

The modified function looks like:

conn_rec *new_connection(pool *p, server_rec *server, BUFF *inout, const struct sockaddr_in *remaddr, const struct sockaddr_in *saddr, int child_num)

```
{
conn_rec *conn = (conn_rec *) pcalloc(p, sizeof(conn_rec));
/* Got a connection structure, so initialize what fields we can * (the rest
are zeroed out by pcalloc).
 */
/* Initializing authResult to invalid
This value will be set by mod_auth_oracle at time of external
authentication.
 */
conn->authResult = VAL_INVALID;
conn->child_num = child_num;
........
``` mod_auth_oracle.c

This is an external module that is linked in the apache httpd executable. This module authenticates a user against the database. This module is invoked if the document being accessed is in a secure section of the website. Details of this module are being skipped and only portions of the code relevant to the event trigger are being discussed in this document.

In the module declaration, which determines what functions will be called by the apache core in what order, we declare the function "check_oracle_authenticate" as the one which will do the "check_user_id".

The declaration looks like:

module oracle_auth_module=

```
{
STANDARD_MODULE_STUFF,
NULL,      /* initializer */
NULL,      /* dir config creater */
NULL,      /* dir merger---default is to override*/
......
    check_oracle_authenticate, /* check_user_id */
    check_oracle_access, /* check auth */
    NULL,       /* check access */
....
```

The function "check_oracle_authenticate" is the one that gets the userid and password and spawns off a function, "systemAuth" (passing these values to it). The function "systemAuth" executes another program (a shell script that calls a Java program). It is this program that does the authentication. It also checks certain elements in the profile of this user. The results are returned as an integer back to "systemAuth", which in turn returns them back to "check_oracle_authenticate". This function then checks the result returned by the external program to see if the current profile of this user warrants triggering of an event. It sets the value of "authResult" accordingly.

Here's the code behind all this:

int check_oracle_authenticate (request_rec *r)

```
{
    ......
char *sent_pw;
int res, execVal;
conn_rec *c;
    ......
c =r->connection;
/* Check if password is available-if not
return - it will be handled the next time this function is called.
    */
if ((res = get_basic_auth_pw (r, &sent_pw)))
return res;
execVal = systemAuth(c->user, sent_pw);
if(execVal == INVALID_USER)
    {
sprintf(errstr, "Oracle Authentication (%s): Failed (%d) for
USER: %s PASSWORD : %s", auth_extName, execVal, c->user,
sent_pw);
```

```
    log_reason(errstr, r->filename, r); note_basic_auth_failure ®;
    return AUTH_REQUIRED;
    }
  else
  if(execVal == FIELDS_OK)
    {
    c->authResult = FIELDS_OK; return OK;
    }
  return OK;
  }
```

The function "systemAuth" handles the C to Java communication, via a shell script, "auth.sh" and returns results returned by the script to "check_oracle_authenticate".

There is a system limitation which imposes restrictions on passing parameters containing special characters such as quotes. Since this is an unavoidable problem as usernames/passwords may contain special characters, a workaround has been used in this function. It writes the username and password to a temporary file and passes the name of this file as a parameter to "auth.sh", which reads the username and password from there.

auth.sh, in conjunction with a Java program validates the username and password against an Oracle database and also draws up the profile associated with this username. This program is external to the web server so it can be modified to check any criteria. The result is returned in the form of an integer.

In the example that we've been following in this document, the program would return INVALID_USER if the username/password doesn't exist in the database. If it determines that the current profile of this username requires an event to be fired, it will return VAL_INVALID, otherwise it will return FIELDS_OK.

int systemAuth(char *user, char *pass)

```
  {
  pid_t pid;
  int status;
  char result[500];
  char command[1024];
  char *cmd = "/home/otn/auth.sh";
  int myPid = getpid();
  char fileName[150];
  sprintf(fileName, "%s%s%d.usp",BASE_DIR, "USP",myPid);
  bufUSP = fopen(fileName, "w");
  fprintf(bufUSP, "%s\n", user);
  fprintf(bufUSP, "%s", pass);
  fclose(bufUSP);
  strcpy(command, cmd);
  strcat(command, "");
  strcat(command, fileName);
  pbuf = popen((char *)command, "r");
  while(fgets(result,500,pbuf) != NULL); return
  atoi(result);
  }
```

The decision whether the user should be redirected (the event trigger) is taken by the rewrite module, based on the value of "authResult" (set by the authentication module as explained above).

The C file containing this module is "mod_rewrite.c". Among other things, this module handles the directives "RewriteRule" and "RewriteCond" which may be specified in a .htaccess file, present the secure directory which contains the html file being accessed.

"RewriteRule" allows automatic redirection to another page/CGI-script. A condition can be applied to this redirection by using "RewriteCond".

In our case, the .htaccess file would look something like:
    RewriteEngine on RewriteCond %{ENV:TrackVar} !(OTN1) RewriteRule (^[a-zA-Z0-9/]*)\.html$ /home/otn/cgi-bin/trigger.sh The first line simply indicates that the rewrite engine is applicable in this directory. The third line, "RewriteRule" indicates that any access to an html file should be redirected to the CGI-script "/home/otn/cgi-bin/trigger.sh". The "RewriteCond" is a condition placed by us which makes sure that the "RewriteRule" is applied only if the right conditions exist (ie. if the event trigger should be fired). In mod_rewrite.c, the function "apply_rewrite_cond" determines whether a particular rule should be applied or not. For every rule, this function receives a structure describing the associated conditions. This function has been changed so that it makes sure that the redirection is not applied if the user's profile is ok. This would be true if the value of "authResult" is FIELDS_OK.

Essentially, if this function returns a 0, then the corresponding rewrite rule is not applied. So, we check if the rewrite condition is "%{ENV:TrackVar}". If so, then we're looking at the correct rewrite rule. Next we check if the value of "authResult" is FIELDS_OK. If so, we return a 0, in which case the rule is not applied. Otherwise, we let the normal processing go on. This normal processing would allow the user to be transferred to the CGI script that brings up the event page.

static int apply_rewrite_cond(request_rec *r, rewritecond_entry *p, char *perdir)

```
  {
  char *input;
  int rc;
  struct stat sb;
  request_rec *rsub;
  /* first, we have to expand the input string to match */
  input = expand_variables(r, p->input);
  if(strcmp(->input, "% {ENV:TrackVar}") =0)
    {
    if(r->connection->authResult == FIELDS_OK)
    return 0;
    }
    .......
```

As defined in the .htaccess file above, if "authResult" is not equal to FIELDS_OK, the user is redirected to "/home/otn/cgi-bin/trigger.sh".

"trigger.sh" is a Bourne shell script which fires off a Java program that generates the actual HTML page.

This is how the script looks like:
!/bin/sh
CLASSPATH=/web/dev-OTNtools/triggers/level2/java:/
    web/dev-OTNtools:/web/dev-OT Ntools/jdbc/classesl111.zip
export CLASSPATH
/web/jdk/bin/java GetLevel2Info $REQUEST_URI $REMOTE_USER It is invoking a Java program, "GetLevel2Info". The most important part here is that it's passing "REQUEST_URI" as a parameter to the program. "REQUEST_URI" is an environment variable set by the web server, which contains the URL that was originally requested by the user.

GetLevel2Info.java then generates an HTML page containing a FORM and passes the original URL as a hidden parameter, so it can be used for eventually redirecting the user to the page he/she initially requested. In our example, GetLevel2Info.java brings up a page in which the user can enter some information. The corresponding FORM has its ACTION set to another Java program UpdateLevel2Info.java, which writes the data gathered by the GetLevel2Info.java form. It then brings up a thank you page, containing a button. If you click on this button, you will be transported to the original page. This is because this button is a SUBMIT button in a form, with its ACTION set to the original URL.

Note that when the user clicks this button, again authentication will be done as the original page is in a secure area. Similarly, conditions for the event will be checked. But since the conditions were negated by UpdateLevel2Info.java as it wrote the missing information in the database, this time "apply_rewrite_cond" in mod_rewrite.c will return a 0, preventing the user from being redirected to the CGI-script "trigger.sh".

The relevant code is listed hereafter—some of this is discussed as pseudo-code:
GetLevel2Info.java:
public static void main(String[] args)

```
{
    .....
    String originalURI = args[0];
    String userName = args[1];
    .....
    createScreen(originalURI, userName);
}
public static void createScreen(String originalURI, String userName)
{
// Print header: ie Content-type etc.
    ...
// Print starting HTML tags such as <HTML><HEAD> etc.
    ...
// Print a form containing a text field in which we'll capture
// required information.
System.out.println("<FORM NAME='myForm1'
ACTION ='/cgi-bin/updateField.sh'>");
System.out.println("<INPUT TYPE ='text' NAME='missingField'
VALUE='>");
// Add a hidden field to the form, containing the original URI
System.out.println("<INPUT TYPE ='hidden' NAME =' originalURI'
VALUE='" + originalURI + "'>");
// Add a hidden field to the form, containing the username
// This will be used by the update program to update profile of this
user
System.out.println("<INPUT TYPE ='hidden' NAME ='userName'
VALUE =2 38 + userName +"'>");
System.out.println("<CENTER ><INPUT TYPE='submit'
VALUE='OK'></CENTER>");
System.out.println("</FORM>");
System.out.println("</BODY></HTML>");
}
```

The script updateField.sh calls UpdateLevel2Info.java which updates the profile of the user.
updateField.sh
!/bin/sh
CLASSPATH=/web/dev-OTNtools/triggers/email/java:/web/dev-OTNtools:/web/dev-OTN tools/jdbc/classes111.zip
export CLASSPATH
/web/jdk/bin/java UpdateLevel2Info $QUERY_STRING
exit QUERY_STRING is an environment variable which contains all the CGI-variables and their values from the previous form. This will be parsed by UpdateLevel2Info.java to determine the value entered by the user in the text field of the form. Also, values of "username" and "originalURI" will be retrieved.
UpdateLevel2Info.java:
public static void main(String[] args)

```
{
String queryString = args[0];
String userName = getFieldFromQueryString("userName", queryString);
String originalURI = getFieldFromQueryString("originalURI",
queryString);
String missingField =getFieldFromQueryString("missingField",
queryString);
updateFields(userName, missingField);
moveToAllOkNowScreen(originalURI);
}
public static void updateFields(String userName, String missingField)
{
// This method updates the value entered by the user in the database.
}
public static void moveToAllOkNowScreen(String originalURI)
{
// Print header: ie Content-type etc.
    ...
System.out.println("<HTML><HEAD><TITLE>Profile Update
Completed</TITLE></HEAD>");
System.out.println("");
System.out.println("<BODY BGCOLOR ='#FFFFFF'>");
System.out.println("<CENTER><H1 ><FONT FACE='Arial,Helvetica'>
Profile Update Completed </FONT></H1></CENTER>");
System.out.println("<P><CENTER>Thank you for updating your
shipping/membership profile.<P> Please click the button below
to continue </H3></CENTER><P>");
String toPrint = "";
System.out.println("<FORM NAME='m_vivekForm' ACTION='" +
originalURI
"'><CENTER><INPUT TYPE ='submit' NAME='mySubmit'
VALUE ='The page you originally requested'></CENTER></FORM>");
System.out.println("</BODY></HTML>");
}
```

Here, when the user clicks the button, he/she is re routed to the original page, provided their profile doesn't require the trigger to be fired again or another trigger needs to be invoked.

What is claimed is:

1. A method for server interruption of user requests, the method comprising the steps of:

a server receiving a request from a user for a particular set of information, wherein preparation and delivery of said particular set of information requires a particular series of operations;

in response to said request, said server collecting supplemental information about said user from a server-side storage unit; and said server determining, based on said supplemental information, whether to perform one or more operations prior to supplying said particular set of information to said user, wherein said one or more operations do not alter any operation in said particular series of operations;

if said server determines that said one or more operations should be performed, then performing said one or more operations prior to supplying said particular set of information to said user, and after performing said one or more operations, said server replying to said user with said particular set of information; and if said server determines not to perform said one or more operations, then replying to said user with said particular set of information.

2. The method of claim 1 wherein:

said request is for restricted information;

said server requests authentication information from said user;

based on said authentication information, said server determines whether said user is authorized to access said restricted information; and the step of performing said one or more operations is performed after said server determines that said user is authorized and before said server replies to said user with said particular set of information.

3. The method of claim 2 wherein the step of determining whether said user is authorized includes comparing said authentication information supplied by said user with server-side authentication information, and wherein a single retrieval operation is used to perform the steps of collecting supplemental information and collecting said server-side authentication information.

4. The method of claim 1 wherein the step of collecting supplemental information about said user includes the step of collecting supplemental information from a relational database.

5. The method of claim 1 wherein the step of collecting supplemental information about said user includes the step of collecting supplemental information from a flat file.

6. The method of claim 1 wherein:

said server receives a second request from a second user for said particular set of information;

in response to said second request, said server collects second supplemental information about said second user from said server-side storage unit;

said server determines from said second supplemental information that one or more operations need not be performed; and said server replies to said second client with said particular set of information.

7. The method of claim 1 wherein the step of collecting supplemental information includes the step of collecting supplemental information from a record that contains information exclusively associated with said user.

8. The method of claim 7 wherein the step of performing one or more operations includes the step of requesting said user to update said record.

9. The method of claim 8 wherein the step of requesting said user to update said record includes requesting said user to supply at least one of a userid, a password, an email address, a home address, and a list of favorite activities.

10. The method of claim 7 wherein the step of collecting supplemental information about said user includes the step of retrieving one of a userid, a password, an email address, a home address, and a list of favorite activities from said record.

11. The method of claim 1 wherein the step of determining whether to perform said one or more operations includes the step of determining whether said supplemental information contains null data.

12. The method of claim 1 wherein the step of performing one or more operations includes the step of displaying marketing information to said user.

13. The method of claim 1 wherein the step of performing one or more operations includes the step of executing one or more executable files.

14. The method of claim 1 wherein the step of performing one or more operations includes the step of sending to said user one or more unrequested web pages.

15. The method of claim 1 wherein the step of performing one or more operations includes the step of displaying a message thanking said client.

16. The method of claim 1 wherein the step of determining whether to perform one or more operations includes determining whether to perform said one or more operations based on said supplemental information and rules data.

17. The method of claim 16 further comprising the step of reading into an interrupt mechanism the rules data from an external source, wherein the rules data programs the interrupt mechanism with logic used by the interrupt mechanism to determine whether to perform the one or more operations.

18. The method of claim 1 wherein after performing said one or more operations as a first interrupt and before replying to said client with said particular set of information performing the steps of:

said server determining, based on said supplemental information, whether to perform a second interrupt; and if said server determines to perform said second interrupt, then said server performing said second interrupt prior to supplying said particular set of information to said client.

19. The method of claim 18 wherein said supplemental information that is used to determine whether to perform said second interrupt includes output from said first interrupt.

20. The method of claim 1 wherein the step of determining whether to perform one or more operations is further based on whether previous interrupts have been performed in response to said request.

21. The method of claim 20 further comprising the step of tracking how many interrupts are performed in response to said request, wherein the step of determining whether to perform one or more operations is further based on how many previous interrupts have been performed in response to said request.

22. The method of claim 1 wherein the step of replying to said user with said particular set of information is performed in response to said user sending a second request for said particular set of information.

23. The method of claim 1 wherein the step of replying to said user includes replying to said user with said particular set of information when a predetermined amount of time elapses after performing one or more operations.

24. A computer-readable medium carrying one or more sequences of instructions for server interruption of user requests, wherein execution of the one or more sequences of instructions by one or more processors causes the one or more processors to perform the steps of:

in response to a request from a user for a particular set of information, a server collecting supplemental information about said user from a server-side storage unit;

wherein preparation and delivery of said particular set of information requires a particular series of operations;

said server determining, based on said supplemental information, whether to perform one or more operations prior to supplying said particular set of information to said user;

wherein said one or more operations do not alter any operation in said particular series of operations;

if said server determines that said one or more operations should be performed, then
performing said one or more operations prior to supplying said particular set of information to said user, and
after performing said one or more operations, said server replying to said user with said particular set of information; and
if said server determines not to perform said one or more operations, then replying to said user with said particular set of information.

25. The computer-readable medium of claim 24 wherein:
said request is for restricted information;
said server requests authentication information from said user;
based on said authentication information, said server determines whether said user is authorized to access said restricted information; and
the step of performing said one or more operations is performed after said server determines that said user is authorized and before said server replies to said user with said particular set of information.

26. The computer-readable medium of claim 25 wherein the step of determining whether said user is authorized includes comparing said authentication information supplied by said user with server-side authentication information, and wherein a single retrieval operation is used to perform the steps of collecting supplemental information and collecting said server-side authentication information.

27. The computer-readable medium of claim 24 wherein the step of collecting supplemental information about said user includes the step of collecting supplemental information from a relational database.

28. The computer-readable medium of claim 24 wherein the step of collecting supplemental information about said user includes the step of collecting supplemental information from a flat file.

29. The computer-readable medium of claim 24 wherein:
said server receives a second request from a second user for said particular set of information;
in response to said second request, said server collects second supplemental information about said second user from said server-side storage unit;
said server determines from said second supplemental information that one or more operations need not be performed; and
said server replies to said second client with said particular set of information.

30. The computer-readable medium of claim 24 wherein the step of collecting supplemental information includes the step of collecting supplemental information from a record that contains information exclusively associated with said user.

31. The computer-readable medium of claim 30 wherein the step of performing one or more operations includes the step of requesting said user to update said record.

32. The computer-readable medium of claim 31 wherein the step of requesting said user to update said record includes requesting said user to supply at least one of a userid, a password, an email address, a home address, and a list of favorite activities.

33. The computer-readable medium of claim 30 wherein the step of collecting supplemental information about said user includes the step of retrieving one of a userid, a password, an email address, a home address, and a list of favorite activities from said record.

34. The computer-readable medium of claim 24 wherein the step of determining whether to perform said one or more operations includes the step of determining whether said supplemental information contains null data.

35. The computer-readable medium of claim 24 wherein the step of performing one or more operations includes the step of displaying marketing information to said user.

36. The computer-readable medium of claim 24 wherein the step of performing one or more operations includes the step of executing one or more executable files.

37. The computer-readable medium of claim 24 wherein the step of performing one or more operations includes the step of sending to said user one or more unrequested web pages.

38. The computer-readable medium of claim 24 wherein the step of performing one or more operations includes the step of displaying a message thanking said client.

39. The computer-readable medium of claim 24 wherein the step of determining whether to perform one or more operations includes determining whether to perform said one or more operations based on said supplemental information and rules data.

40. The computer-readable medium of claim 39 further comprising instructions for performing the step of reading into an interrupt mechanism the rules data from an external source, wherein the rules data programs the interrupt mechanism with logic used by the interrupt mechanism to determine whether to perform the one or more operations.

41. The computer-readable medium of claim 24 wherein after performing said one or more operations as a first interrupt and before replying to said client with said particular set of information performing the steps of:
said server determining, based on said supplemental information, whether to perform a second interrupt; and
if said server determines to perform said second interrupt, then said server performing said second interrupt prior to supplying said particular set of information to said client.

42. The computer-readable medium of claim 41 wherein said supplemental information that is used to determine whether to perform said second interrupt includes output from said first interrupt.

43. The computer-readable medium of claim 24 wherein the step of determining whether to perform one or more operations is further based on whether previous interrupts have been performed in response to said request.

44. The computer-readable medium of claim 43 further comprising the step of tracking how many interrupts are performed in response to said request, wherein the step of determining whether to perform one or more operations is further based on how many previous interrupts have been performed in response to said request.

45. The computer-readable medium of claim 24 wherein the step of replying to said user with said particular set of information is performed in response to said user sending a second request for said particular set of information.

46. The computer-readable medium of claim 24 wherein the step of replying to said user includes replying to said user with said particular set of information when a predetermined amount of time elapses after performing one or more operations.

47. A system comprising:
a plurality of clients;
a server;
a network coupling said plurality of clients to said server to allow communication between said plurality of clients and said server;

said server being configured to receive a request for a particular set of information by any client of said plurality of clients, wherein preparation and delivery of said particular set of information requires a particular series of operations, and to respond to said request by performing the steps of:

collecting supplemental information from a server-side storage unit about a user that initiated said request; and determining, based on said supplemental information, whether to perform one or more operations prior to supplying said particular set of information to said user, wherein said one or more operations do not alter any operation in said particular series of operations;

if said server determines that said one or more operations should be performed, then performing said one or more operations prior to supplying said particular set of information to said user, and after performing said one or more operations, said server replying to said user with said particular set of information; and if said server determines not to perform said one or more operations, then replying to said user with said particular set of information.

48. The system of claim 47 wherein:

the plurality of clients are a plurality of web browsers;

the server is a web server; and the particular set of information is a first web page.

49. The system of claim 48 wherein the one or more operations include delivering a second web page to a browser that issued said request for said first web page, wherein said second web page is different from said first web page.

* * * * *